(12) United States Patent
Gregg

(10) Patent No.: US 7,343,985 B1
(45) Date of Patent: Mar. 18, 2008

(54) BIT BALLING TREATMENT

(76) Inventor: Harold Gregg, 207 S. Main, Kemp, TX (US) 75143

( * ) Notice: Subject to any disclaimer, the term of this patent is extended or adjusted under 35 U.S.C. 154(b) by 0 days.

(21) Appl. No.: 11/678,905

(22) Filed: Feb. 26, 2007

(51) Int. Cl.
*E21B 7/26* (2006.01)

(52) U.S. Cl. .............................. 175/64; 175/21; 175/57

(58) Field of Classification Search ...................... None
See application file for complete search history.

(56) References Cited

U.S. PATENT DOCUMENTS

| 4,964,465 | A | * | 10/1990 | Surles ........................ 166/295 |
| 4,984,643 | A | | 1/1991 | Isbell et al. |
| 7,268,100 | B2 | * | 9/2007 | Kippie et al. ................ 507/131 |
| 2006/0081369 | A1 | * | 4/2006 | Kriegel ....................... 166/278 |

FOREIGN PATENT DOCUMENTS

EP 0400532 A1 12/1990

OTHER PUBLICATIONS

Roy, S. & Cooper, G.A. "The effect of electro-osmosis on the indentation of clays" Proc of the the 32nd US Rock Mechanics Symposium, Norman, OK, Jul. 1991. pp. 335-344.
Smith, et al., "Hydraulics Optimization Research in Large Diameter Bits Reduces Operator's Variable Costs" AASDE-05-NTCE-58 (2005) pp. 1-10.

* cited by examiner

*Primary Examiner*—Zakiya W. Bates
(74) *Attorney, Agent, or Firm*—Lathrop & Gage LC

(57) ABSTRACT

A solid body contains a surfactant and crushed walnut hulls. The solid body is shaped to predetermined dimensions that permit passage through the central interior opening of drill pipe. The solid body dissolves in drilling mud for delivery of a pill to the annulus through the drill bit nozzles. The pill is an effective treatment against bit balling.

14 Claims, 4 Drawing Sheets

BIT BALLING TREATMENT

BACKGROUND

1. Field of the Invention

The field of the invention pertains to drilling fluid additives that may be used to remediate bit balling that otherwise occurs in clay and shale (hereafter referred to collectively as 'clay') zones as a well is drilled.

2. Description of the Related Art

Water-based drilling mud systems are usually employed during the drilling of a well, such as an oil or gas well. The well bore may penetrate a clay zone, and this circumstance exposes naturally occurring clay minerals. Water in the mud is able to hydrate the clay minerals, which then typically swell to cause a number of known problems.

The clay problems may be addressed by using chemical treating agents. This is done using salts and/or polymers in the drilling mud. Salts, such as KCl or CaCl, reduce the clay swelling and dispersion. Such polymers as partially hydrolyzed polyacrylamide are sometimes added to the drilling mud used to encapsulate the clay, thus keeping the clay from hydrating and swelling. Alternatively, oil-based mud may be used to prevent the swelling phenomenon, but since oil mud also contains water, it is necessary that the salinity of the water be sufficiently high to prevent water from entering the clay by osmosis.

Bit balling is one problem that is frequently encountered when drilling through clay. The problem is caused by the tendency of hydrated clay minerals to stick or adhere to the bit and bottom-hole assembly of a drill string. Although this problem may also occur in oil based mud, it is relatively rare as compared to water-based mud. From an operations standpoint, bit balling is evidenced by increased pump pressures as the flow pathway through the well bore annulus becomes blocked, reduced rates of penetration, blocked shaker screens, a required over-pull tension that occurs due to a restricted annulus when tripping pipe, and possible stuck pipe.

Once bit balling is diagnosed, conventional methods of remediation are to increase the weight on the bit, add chemicals and perhaps pull the drill pipe out of the hole to clean the bit and bottom hole assembly. For a water-based mud, a detergent may be added to the drilling mud to reduce the ability of the hydrated clay to stick to the bit and bottom hole assembly. Glycol may also be added at about 3% to 4% of system volume. This often fails to cure the problem.

Preventative measures against bit balling include the review of prior drilling reports to ascertain and adopt procedures that have previously worked in the geographic area to overcome bit balling. A KCl/polymer or CaCl/polymer mud may be used to inhibit the swelling of clays. The selection of a bit may also affect bit balling, where it is known that polycrystalline diamond compact bits are more prone to balling than are tri-cone bits, and it is further the case that the arrangement of teeth structures on tri-cone bits may affect bit balling. This is shown for example, in U.S. Pat. No. 4,984,643 issued to Isbell et al.

Another way to address the problem of bit balling is to optimize the mud system hydraulics. This may be done for either large or small bore bits. In addition to sizing the nozzles for optimum delivery of hydraulic horsepower, it is also possible to direct the nozzle discharge to optimize bottom-hole cleaning in a 'mud pick' configuration. This is reported, for example, in Smith et al., Hydraulics Optimization Research in Large Diameter Bits Reduces Operator's Variable Costs, AASDE-05-NTCE-58 (2005).

It has also been reported that maintaining a negative potential of a few volts on the drill string assembly may liberate water at the interface between the bit and the hydrated clay. See Sanjit et al., The effect of electro-osmosis on the indentation of clays, Proceedings of the 32nd US Rock Mechanics Symposium, Norman Okla. (July 1991).

Although the art does provide remedial measures, bit balling continues to be a significant factor affecting the costs of drilling new wells. It is particularly difficult to pump pills of material to remediate the problem of bit balling, and any such measures often provide only temporary relief.

SUMMARY

The present instrumentalities overcome the problems outlined above and advances the art by providing a compact and easy to use article of manufacture for introducing treatments to a drilling mud system.

In one embodiment, the article is formed as a solid body that contains a combination of nut hulls and a surfactant that are bound together with an optional carrier. As used herein the term "solid" also encompasses a gel unless specifically noted otherwise. The carrier may be a soft wax, such as beeswax, having a melting temperature much less than is expected at the bit. Beeswax generally melts at a temperature of 144° to 149° F. Thus, in an area where there exists a geothermal gradient of 1.8° F. per 100 feet of well, it may be expected that a well in excess of 8000 feet of depth will reach this temperature. A plasticizer, such as glycerol or castor oil, may be added to reduce the melting temperature. Alternatively, a water soluble polymer may be used as the carrier. This may be, for example, an ethylene/vinyl alcohol copolymer with a de-structured starch composition and a plasticizer, such as glycerin, with urea as a de-structuring agent. Suitable compositions are reported in EP0400532A1 to Bastioli et al., which is incorporated by reference to the same extent as though fully disclosed herein. The carrier is nonessential, since the surfactant itself may bind the nut hulls.

In dissolved form, the solid body forms a pill. A "pill" is hereby defined as any relatively small quantity, less than 200 bbl, of a special drilling fluid that is provided to accomplish a specific task that the regular drilling fluid cannot perform. Examples of conventional pills include the use of high-viscosity pills to help lift cuttings out of a vertical well bore, pipe-freeing pills to destroy filter cake and relieve differential sticking forces and lost circulation material pills to plug a thief zone. The pill that is formed of the dissolved solid body is used against bit balling.

The surfactant may be any surfactant; which may be a detergent, a wetting agent, or an emulsifier. Detergents are preferred. The detergent may be a soap, such as a sodium soap of a fatty acid. The detergent may also be classified as an ionic, anionic, or cationic detergent depending upon the mode of action. Sulfonates are especially preferred, and particularly linear alkyl sulfonates for their biodegradability. Soaps may be particularly useful, as a saponification reaction may be used to react and harden a glycerol ester as a soap during the casting process. In some embodiments, a potassium or sodium lye may be used to saponify a C15 to C20 fatty acid. The C18 fatty acids are particularly preferred where, for example, the resultant soap may be a saponified castor oil comprised mostly of ricinoleic acid, or oleic acid.

The nut hulls may be any nut hulls, but the use of walnut hulls is particularly preferred. Crushed walnut hulls that have been screened through −30/+60 US mesh are commonly purchased on commercial order and used to remediate lost circulation in wells. These may be mixed with other hull materials, including similarly sized cottonseed hulls, pecan shells, and almond shells. Use of the walnut hulls in the present instrumentality differs in that the walnut hulls are generally hard and lightweight, and may be used to blast hydrated clay from the bit and bottom hole assembly, once softened by the surfactant.

The article of manufacture may be used in a method of treating a drilling mud system to overcome bit balling The following disclosure makes these and other advantages are apparent to those skilled in the art.

DETAILED DESCRIPTION

Figure 1:
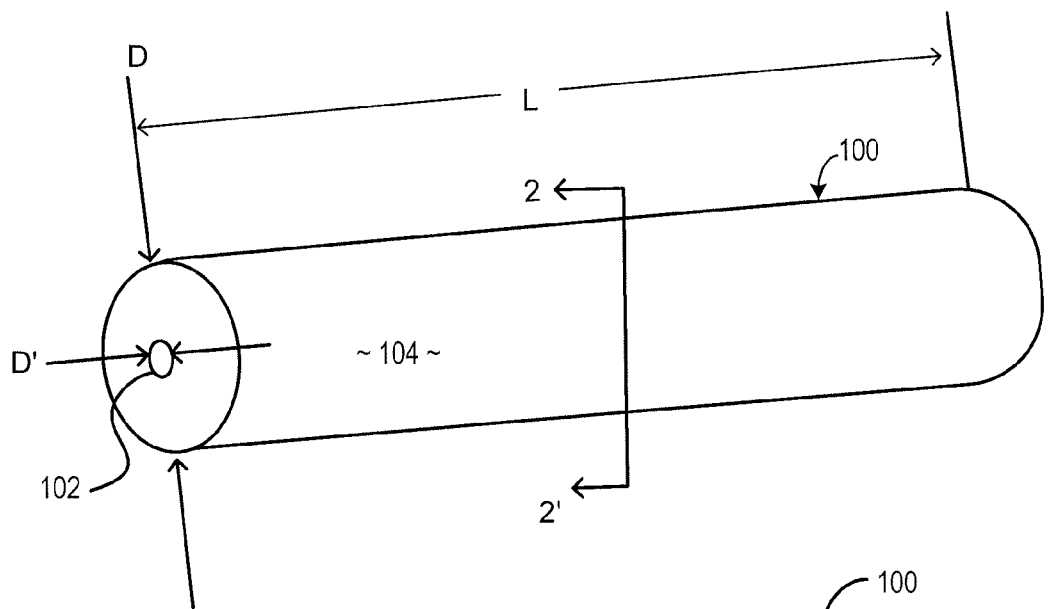
FIG. 1 shows a solid body that may be used to provide a pill for the treatment of bit balling.
Figure 2:
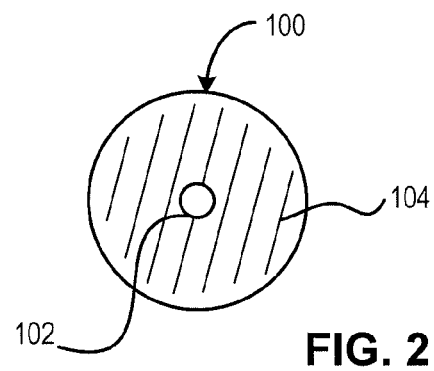
FIG. 2 is a cross-sectional view taken along line 2-2' of FIG. 1.

There will now be shown and described an article for use in treating a bit balling problem. FIG. 1 shows an article 100 that is formed as a generally cylindrical tube having a diameter D and a length L. A center hole 102 presents a diameter D'. A wall 104 is made of a surfactant, crushed hulls, and a dissoluble carrier. FIG. 2 presents a sectional view taken along line 2-2' of FIG. 1.

Dimensions are not critical, except the diameter D must be sufficiently small to pass through the interior of a drill pipe. Hole 102 is provided to assist circulation of mud through the article 100, in order to facilitate dissolution. By way of example, suitable dimensions for most applications include a diameter D of 1 to 1.5 inches, a length L of about 20 to 30 inches, with 27 inches being most preferred, and a diameter D' of about 1/16 to 1/2 inch.

Article 100 contains a combination of nut hulls and a surfactant that are bound together with a carrier. The carrier may be a soft wax, such as beeswax, having a melting temperature much less than is expected at the bit. Beeswax generally melts at a temperature of 144° to 149° F. Thus, in an area where there exists a geothemal gradient of 1.8° F. per 100 feet of well bore, it may be expected that a well in excess of 8000 feet of depth will reach this temperature. A plasticizer, such as glycerol, may be added to reduce the melting temperature suitably for shallower depths. Alternatively, a water soluble polymer may be used as the carrier. This may be, for example, an ethylene/vinyl alcohol copolymer with a de-structured starch composition and a plasticizer, such as glycerin. Urea may be used as a de-structuring agent. Suitable polymeric compositions for this use are reported in EP0400532A1 to Bastioli et al.

In some cases, the carrier may be a soap. It is possible to combine the nut hulls with the glycerol ester of a fatty acid, or another ester, pour the mixture into a mold, and cast the article 100 to saponify and harden the mixture, then release from the mold. In this case, the resultant soap holds together the nut hulls.

Figure 3:
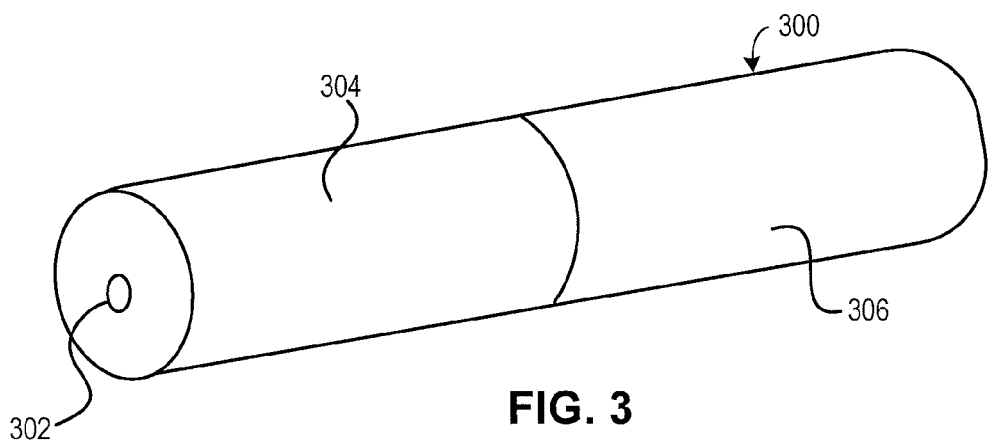
FIG. 3 shows another embodiment of the solid body.

FIG. 3 shows another embodiment as article 300 with center hole 302. In this case, half of the article 300 is a surfactant 304 and the other half 306 contains nut hulls bound with a carrier, as described above in context of the wall 104 that is shown in FIG. 1. The respective halves 304, 306 are cast together in a common mold.

Figure 4:
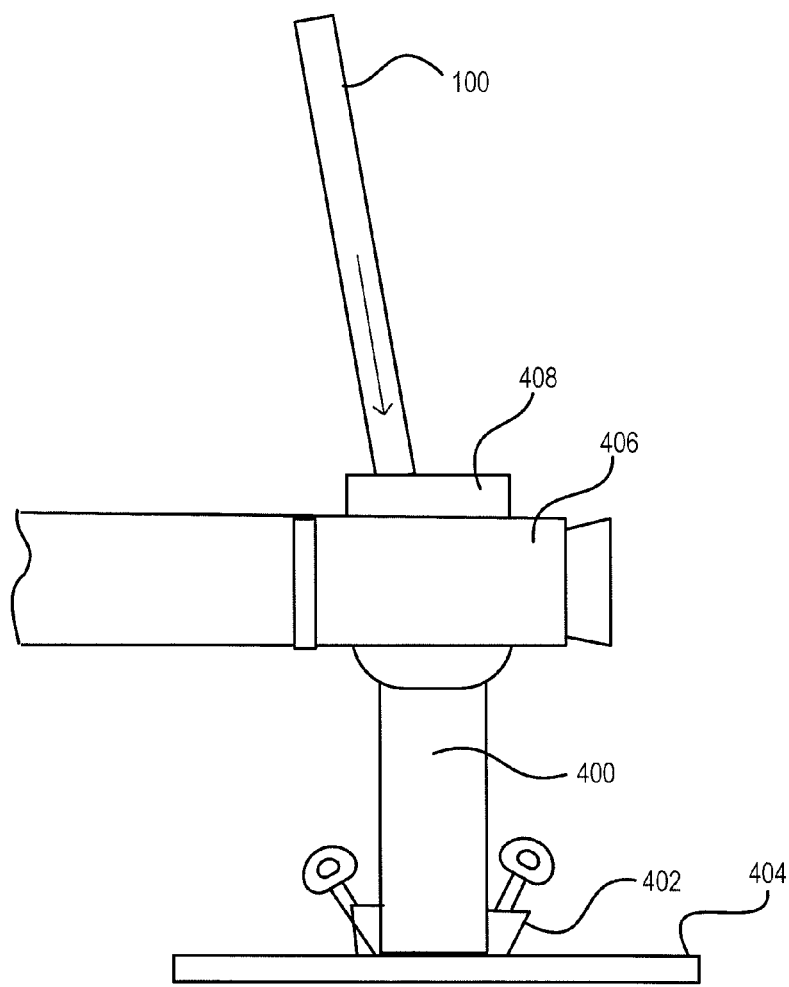
FIG. 4 shows the solid body being inserted into a drill string.

FIG. 4 shows article 100 in use. Drill pipe 400 is retained by slips 402 in a rotary table 404. The drill string, as represented by drill pipe 400, is broken to make a new connection. Tongs 406 are in position for use in assembling the next connection, as is required to advance the drill pipe 400 down the well-bore as the well is drilled. The article 100 is being placed into a female joint 408 that will receive a male pin of the next piece of drill pipe (not shown) as the connection proceeds. Any number of articles 100 may be manually placed in the drill pipe 400 in this manner.

Figure 5:
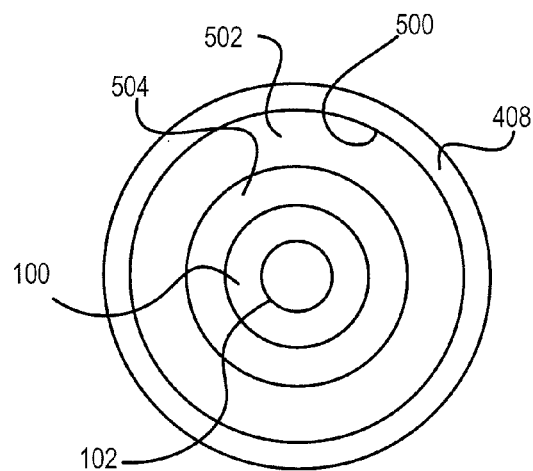
FIG. 5 is a top view of the solid body inserted into the drill string.

FIG. 5 shows the article 100 positioned in the female joint 408. A threaded surface 500 transitions to a curved wall 502 and conduit 504. Article 100 resides within conduit 504. From this position, the connection may be assembled with joint 408, and active drilling may recommence. The recommencement of drilling necessarily entails the pumping of mud through conduit 504. The mud drives article 100 down hole towards the bit. As article 100 proceeds down hole the water in the mud and/or temperature of the mud tends to dissolve article 100 to release the surfactant and the nut hulls, providing what is known in the art as a 'pill'. The surfactant and the nut hulls pass through the nozzles of a drilling bit and enter the annulus of the well-bore where they work against bit balling. The hole 102 and the space between article 100 and the walls of conduit 504 assures that mud pumped through conduit 504 is able to bypass article 100, in order that article does not fully obstruct conduit 504 if article 100 has not completely dissolved by the time it reaches the drill bit (not shown) at the bottom of the hole.

Figure 6:
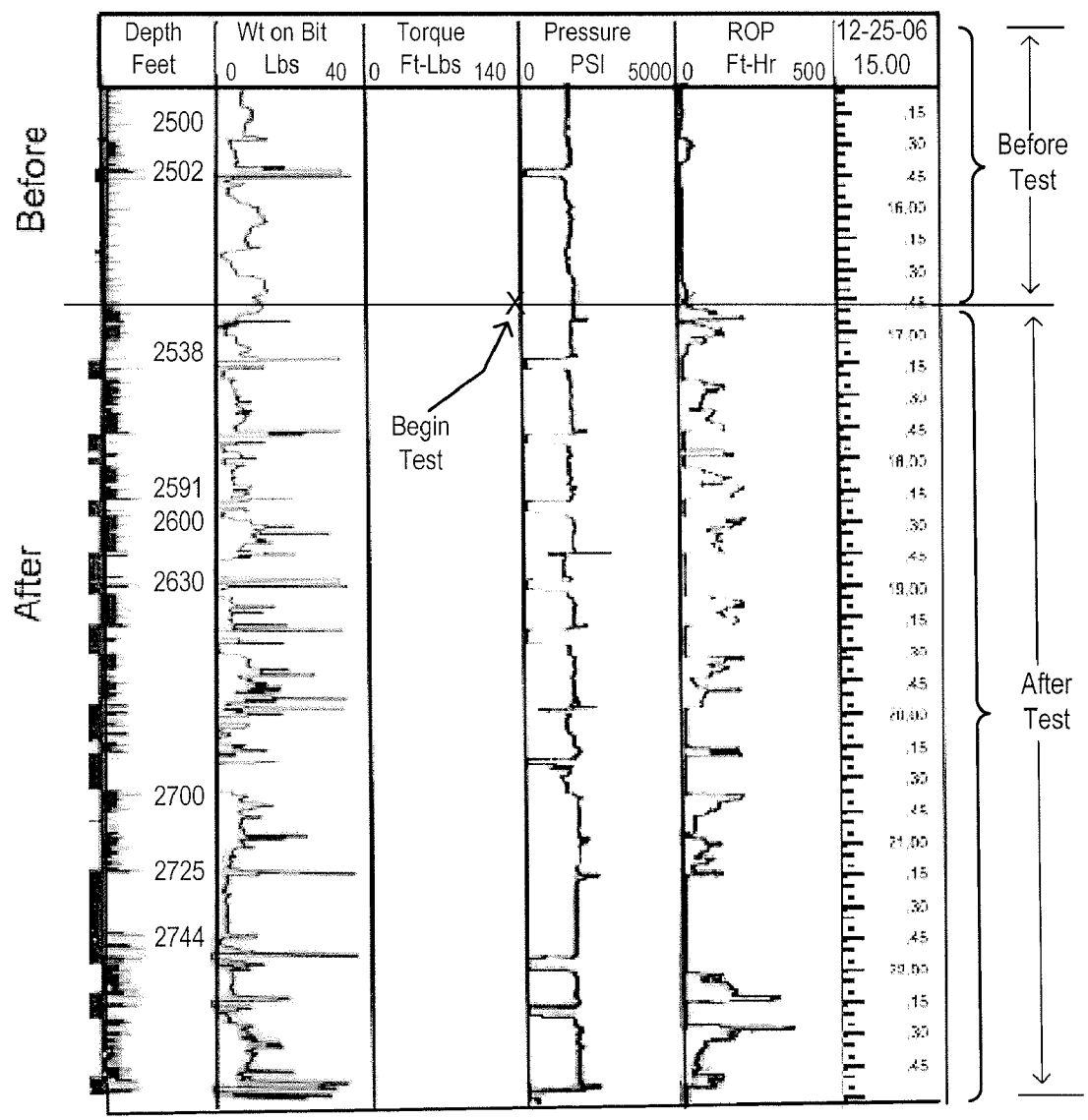
FIG. 6 shows an improvement in a rate of penetration obtained form use of a pill that contains a combination of a detergent and crushed nut hulls.

FIG. 6 shows an improvement in rate of penetration that was obtained using a pill of this nature where the pill contained 0.1 gallons of crushed walnut hulls and 0.3 gallons of liquid soap. The "after" penetration rate shows comparatively that a bit balling problem has been overcome.

Figure 7:
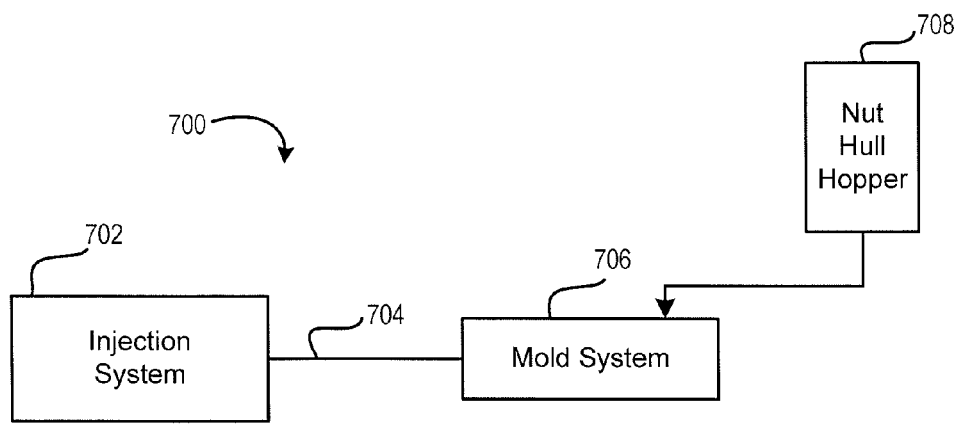
FIG. 7 shows a system for molding the solid body.

FIG. 7 shows a system 700 that may be used to make article 100. An injection system 702 disburses liquid material through line 704 into to mold system 706. A nut hull hopper 708 provides nut hull material for combination with the liquid in the mold system 706. The injection system 702 may be, for example, a screw extruder system for the liquefaction of water soluble polymer material, as described above in context of EP0400532A1. The injection system 702 may also be a metering system for pumping a soap precursor that may be saponified in the mold system 706. Initially cast with a liquid, the articles 100, 300 harden in the mold system 706.

Figure 8:
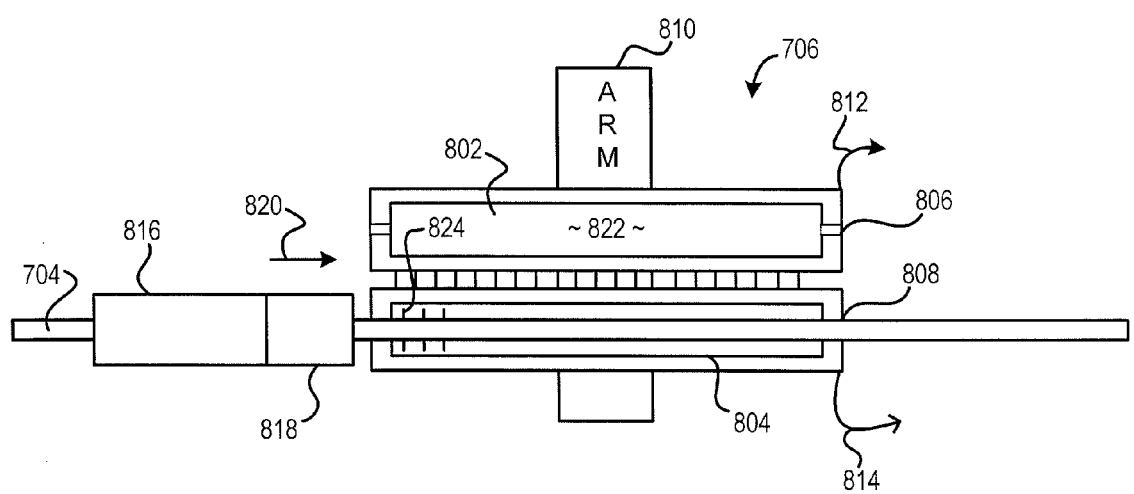
FIG. 8 provides additional detail for the molding system of FIG. 7.

FIG. 8 provides additional detail with respect to one embodiment of the mold system 706. A bivalve mold 800 is formed of respective halves 802, 804, which are notched as at 806, 808 to accommodate line 704. Upon opening of the mold 800, a robotic arm 810 imparts motion 812, 814 to swing the halves 802, 804 away from line 704. With the mold 800 removed in this way, a pneumatic cylinder 816 is mounted on line 704, and is capable of extending head 818 in direction 820 to release cast articles 100 from line 704. The arm 810 then positions the mold 800 as shown in FIG. 8 for receipt of nut material from nut hopper 708 (not shown in FIG. 8). With the mold 800 subsequently closed, line 704 receives liquid material from the injection system 702 and disburses the same into mold cavity 822 through perforations 824. The mold halves 802, 804 may be configured with a heating structure, such as resistive electrical coils or a water jacket (not shown) to heat materials in the mold, for example, to perform a saponification reaction.

EXAMPLES

Table 1 provides various formulations of materials that may be used as articles 100 or 300: A 1.5" diameter stick that is 27" long contains 0.27 gallons of material. Although this is less than the total of 0.4 gallons used in actual testing reported herein. two or more sticks may be used at one time in a stacked sequential order. The calculations below are based on a total stick volume of 0.27 gallons.

TABLE 1

Example compositions

| Article | Material | Amount | Processing Comments |
|---|---|---|---|
| A | Saponified Castor Oil (SCO) | 0.2 gal | Heat to 115°. Mix .01 gal of the SCO together with the walnut hulls. Inject remainder of the SCO into one end of the mold and the SCO/ Walnut hull mixture into the other end. Cool for 360 minutes. Remove from mold. |
|  | Crushed walnut hulls sized - 30/+60 US mesh | 0.07 gal |  |
| B | Beeswax | .01 gal | Heat Beeswax to 144° and mix with walnut hulls. Heat SCO to 115°. Inject each mixture into opposite ends of the mold. Cool for 360 minutes. Remove from mold. |
|  | Saponified Castor Oil (SCO) | 0.19 gal |  |
|  | Crushed walnut hulls sized - 30/+60 US mesh | 0.07 gal |  |
| C | Oleic Acid | 0.14 gal | Add Lye to water. Mix lye/water solution into Oleic Acid. Stir until thick. Mix .01 gal of this solution together with the walnut hulls. Inject remainder of the solution into one end of the mold and the Walnut hull mixture into the other end. Cool for 360 minutes. Remove from mold. |
|  | Lye | 0.02 gal |  |
|  | Crushed walnut hulls sized - 30/+60 US mesh | 0.07 gal |  |
|  | Water | 0.04 gal |  |

Those skilled in the art appreciate that the foregoing instrumentalities teach by way of example, and not by limitation. Accordingly, what is claimed as the invention also encompasses insubstantial changes with respect to what is claimed. The inventor hereby states his intention to rely upon the Doctrine of Equivalents to protect the scope and spirit of the invention.

The invention claimed is:

1. An article for use in the treatment of drilling mud, comprising:
    a solid body including
    a surfactant and
    nut hulls bound,
    the body formed to have predetermined dimensions permitting passage of the body through the interior opening of drill pipe,
    the surfactant being dissoluble in drilling mud.

2. The article of claim 1, wherein the surfactant includes a detergent.

3. The article of claim 2, wherein the detergent includes soap.

4. The article of claim 2, wherein the detergent includes a non-ionic detergent.

5. The article of claim 1, wherein the surfactant includes a linear alkyl sulfonate.

6. The article of claim 1, further comprising a plasticizer mixed with the surfactant.

7. The article of claim 6, wherein the plasticizer includes glycerin.

8. The article of claim 6, wherein the plasticizer includes a glycol.

9. The article of claim 1, wherein the nut hulls include crushed walnut hulls.

10. The article of claim 1 retained within drill pipe.

11. The article of claim 1, further comprising a carrier used as a binder for at least one of the surfactant and the nut hulls.

12. The article of claim 11, wherein the binder includes a water soluble polymer.

13. The article of claim 11, wherein the binder includes beeswax.

14. A method of drilling comprising the steps of:
    providing a solid body formed of a surfactant and nut hulls,
    the solid body formed to have predetermined dimensions that permit passage of the solid body through the interior opening of drill pipe, and the surfactant being dissoluble in drilling mud;
    breaking a drill string to make a connection;
    introducing the solid body into the interior of the drill pipe;
    completing the connection; and
    recommencing drilling operations with the pumping of mud to dissolve the solid body in the mud and form a pill for action against bit balling.

* * * * *